United States Patent
Tyagi et al.

(10) Patent No.: US 9,913,230 B1
(45) Date of Patent: Mar. 6, 2018

(54) REDUCED POWER DEVICE DISCOVERY AND CORRESPONDING DEVICES AND METHODS

(71) Applicant: Motorola Mobility LLC, Chicago, IL (US)

(72) Inventors: Vivek Tyagi, Chicago, IL (US); Sudhir Vissa, Bensenville, IL (US); Douglas Lautner, Round Lake, IL (US); Scott Debates, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/484,598

(22) Filed: Apr. 11, 2017

(51) Int. Cl.

| | |
|---|---|
| *H04B 7/00* | (2006.01) |
| *H04W 52/38* | (2009.01) |
| *H04W 76/02* | (2009.01) |
| *H04B 17/318* | (2015.01) |
| *H04W 64/00* | (2009.01) |
| *H04W 84/18* | (2009.01) |
| *H04W 4/00* | (2018.01) |

(52) U.S. Cl.
CPC ........ *H04W 52/383* (2013.01); *H04B 17/318* (2015.01); *H04W 64/00* (2013.01); *H04W 76/023* (2013.01); *H04W 4/008* (2013.01); *H04W 84/18* (2013.01)

(58) Field of Classification Search
CPC ... H04W 4/008; H04W 8/005; H04W 76/023; H04W 40/244
USPC .................................. 455/69, 522, 41.2, 13.4
See application file for complete search history.

(56) References Cited

U.S. PATENT DOCUMENTS

| | | |
|---|---|---|
| 2011/0028091 A1 | 2/2011 | Higgins et al. |
| 2013/0222137 A1 | 8/2013 | Alameh et al. |
| 2015/0173022 A1 | 6/2015 | Black et al. |
| 2015/0271432 A1* | 9/2015 | Muth ....................... H04N 5/44 348/552 |
| 2016/0337809 A1 | 11/2016 | Narasimha |
| 2017/0171699 A1* | 6/2017 | Jin ......................... H04W 4/008 |
| 2017/0208448 A1* | 7/2017 | Zhu ........................ H04W 8/005 |

* cited by examiner

*Primary Examiner* — Tu X Nguyen
(74) *Attorney, Agent, or Firm* — Philip H. Burrus, IV

(57) ABSTRACT

An electronic device includes one or more processors and a wireless communication circuit. The one or more processors cause the wireless communication circuit to engage in a pairing procedure with at least one other electronic device to establish, during a pairing process, a peer-to-peer wireless communication link with the second electronic device. During pairing, the electronic device determines a minimum signal strength of wireless communication signals required to establish the peer-to-peer wireless communication link. Thereafter, the electronic device communicates at, and/or transmits a device discovery beacon having, a signal strength equal to or less than the minimum signal strength to conserve power.

19 Claims, 8 Drawing Sheets

REDUCED POWER DEVICE DISCOVERY AND CORRESPONDING DEVICES AND METHODS

BACKGROUND

Technical Field

This disclosure relates generally to electronic devices, and more particularly to electronic devices with wireless communication capabilities.

Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications, text messaging, Internet browsing, commerce such as banking, and social networking. The circumstances under which users of mobile communication device use their devices varies widely as well.

Mobile electronic communication devices are equipped with wireless communication circuits. In a smartphone application, these wireless communication circuits can generally communicate across wide area networks, such with as terrestrial base stations in a traditional cellular telephone network. They can sometimes communicate across local area networks, such as with routers, servers, and other devices operating in Wi-Fi networks. They can sometimes even communicate is pico-networks, such as with another electronic device directly in a peer-to-peer network.

When communicating with devices, regardless of networks, devices initially have to be discovered. Moreover, some sort of handshaking or pairing process must occur prior to the communication of data. It would be advantageous to have an improved electronic device and corresponding method to make discovery and pairing operations more efficient.

Figure 1:
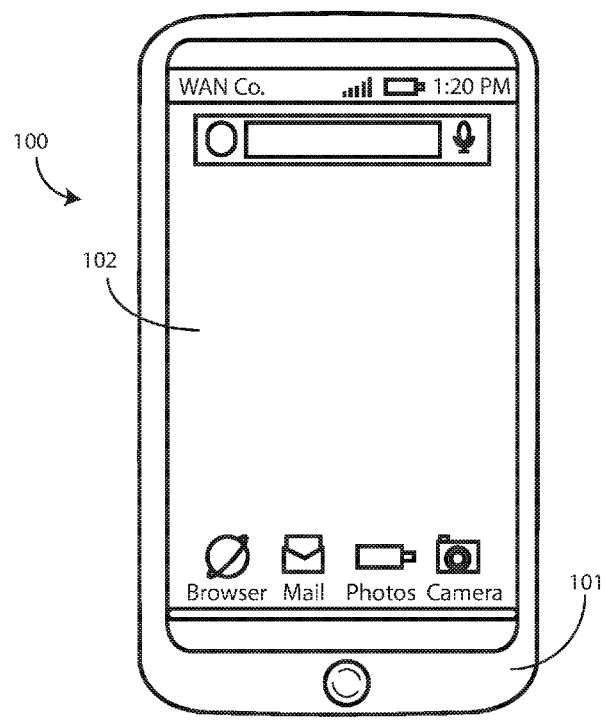
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to controlling power consumption when performing one or more of discovering other electronic devices, pairing with other electronic devices, or communicating with other electronic devices. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or wireless communication technology, improve the functioning of the electronic device itself by solving wireless communication problems arising exclusively in the wireless communication field.

It will be appreciated that embodiments of the disclosure described herein may be comprised of one or more conventional processors and unique stored program instructions that control the one or more processors to implement, in conjunction with certain non-processor circuits, some, most, or all of the functions of controlling power in wireless communication operations as described herein. The non-processor circuits may include, but are not limited to, a radio receiver, a radio transmitter, signal drivers, clock circuits, power source circuits, and user input devices. As such, these functions may be interpreted as steps of a method to perform power consumption control in an electronic device during wireless communications. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

As noted above, when one electronic device will be in communication with another device, one device must discover another. Similarly, some sort of handshaking or pairing process must occur prior to the communication of data. Illustrating by example, a first device may discover another, locally disposed device and may attempt to establish a peer-to-peer network by communicating with the discovered device. The first device may attempt to perform a secure wireless device pairing process to establish a communication link. Using a wireless protocol, such as Bluetooth™, the first device will engage in a handshaking process to establish a communication link.

Embodiments of the disclosure contemplate that these discovery and pairing processes consume relatively large amounts of power. This is true because wireless communication circuits are programmed to perform discovery, hand shaking operations, and wireless communications while transmitting at maximum power levels. This leads to depleted battery capacity and shorter run times for the overall device.

Embodiments of the present disclosure solve this problem by throttling power to a level detected when an electronic device pairs with another. For example, in one or more embodiments a wireless communication circuit transmit and/or receive power level is recorded during a pairing operation. This power level, which can be recorded as a Received Signal Strength (RSS) measurement, a Received Signal Strength Indication (RSSI) measurement, a Received Signal Received Power (RSRP) measurement, or other measurement, serves as an indicator of proximity as the signal strength is proportional to the distance between a first device and a second device.

In one or more embodiments an Application Program Interface (API) is defined to indicate or "flag" that the wireless communication circuit is operating in a reduced power discoverability mode. When this power level at pairing is recorded as a parameter, in one or more embodiments the flag of the API is set through a Application Protocol Parameter (APP) or, alternatively, through a user API.

In one or more embodiments, once the flag is enabled, the wireless communication circuit is configured to scan for a paired device at—or less than—the recorded pairing power level. Advantageously, this saves power in operation by throttling the power of the wireless communication circuit. In one or more embodiments, the pairing power level can further be used as a proxy to determine location of the electronic device. Other advantages will be obvious to those of ordinary skill in the art having the benefit of this disclosure.

In one or more embodiments, a method for pairing electronic devices includes engaging, with a wireless communication circuit of an electronic device, in a pairing procedure to establish a peer-to-peer wireless communication link with a second electronic device. During this pairing process, the electronic device receives, with the wireless communication circuit, one or more wireless communication signals from the second electronic device.

In one or more embodiments, the first electronic device makes, with the wireless communication circuit or one or more processors operable with the wireless communication circuit, received signal strength measurements of the one or more wireless communication signals from the second electronic device. From these measurements, the first electronic device establishes a pairing power signal strength threshold.

Once the pairing power signal strength threshold is determined, in one or more embodiments it can be compensated, i.e., increased or decreased by a predetermined amount, as a function of one or more factors. Illustrating by example, if the first electronic device is a router, it may adjust the pairing power signal strength threshold as a function of one or more of the following: a number of connected devices, the received signal strength from each connected device, the data exchange activity levels of each device, the exact or relative location of each device, any interference that may be seen in peer-to-peer communication links with these devices, and so forth. For instance, the router may select the measured signal strength of the farthest device with the most interference, and increase the power level needed to communicate with that particular device by ten percent to establish the pairing power signal strength threshold for the other devices coupled to the router in the infrastructure mode.

In one or more embodiments, the first electronic device uses one or more processors operable with the wireless communication circuit to place the wireless communication circuit in a reduced power device discovery mode. As noted above, this can be responsive to a flag being marked with an APP or by a user via an API. In one or more embodiments, the wireless communication device then transmits a device discovery beacon having a signal strength equal to or less than the pairing power signal strength threshold. Said differently, the first electronic device scans for paired—or pairable—electronic devices at the reduced power measured during its previous pairing operation, thereby saving any proximity detection and/or wireless communication operations from occurring at maximum power. This conserves energy stored in a battery or other energy storage device, thereby extending device runtime.

Illustrating by example, presume that an electronic device is configured as a smartphone. The smartphone includes a Radio Frequency Identification (RFID) reader, which is a wireless communication device. As the smartphone passes by an RFID tag, which may be coupled to another electronic device like a laptop computer or a passive device, the smartphone determines the maximum output power level required from the RFID reader to read the RFID tag. This power level is then stored.

Thereafter, the smartphone contextually scans for the RFID tag or other RFID devices at the reduced power level stored when reading the first RFID tag. When a device is found, a handshaking operation occurs and a communication link is established.

To ensure that no devices having a proximity beyond that which is reliably communicated with using the reduced power level, in one or more embodiments the wireless communication device transmits a device discovery beacon periodically at a maximum power level while scanning more frequently at the reduced power level. For instance, in one embodiment the wireless communication circuit transmits the device discovery beacon at the reduced power level periodically, such as every N times per second, where N is an integer. However, in one embodiment the wireless communication circuit transmits the device discovery beacon at the maximum signal strength periodically M times per second, where M is an integer that is less than N. Accordingly, the wireless communication circuit saves power by scanning at the reduced power level most of the time, but periodically sends out a "heartbeat" at the maximum signal strength to avoid missing new devices that may move into the peer-to-peer communication range.

Additionally, in one or more embodiments the power level saved during the pairing process can be adjusted as necessary. For example, when a paired device moves away from the electronic device, and where the electronic device is operating at the reduced power level, this will cause a cessation of any peer-to-peer wireless communication link between the two devices. Accordingly, in one embodiment where a cessation of the peer-to-peer communication link occurs, one or more processors operable with the wireless communication circuit can increase the pairing power signal strength threshold. In one embodiment, it is increased to the maximum signal strength threshold. In other embodiments, it can be increased by predetermined amounts. Other increasing techniques will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes one or more housing members. For example, a front housing member can be disposed about the periphery of the display 102, while a rear-housing member forms the backside of the electronic device 100. Features can be incorporated into the housing 101, including an optional camera or an optional speaker port.

Figure 2:
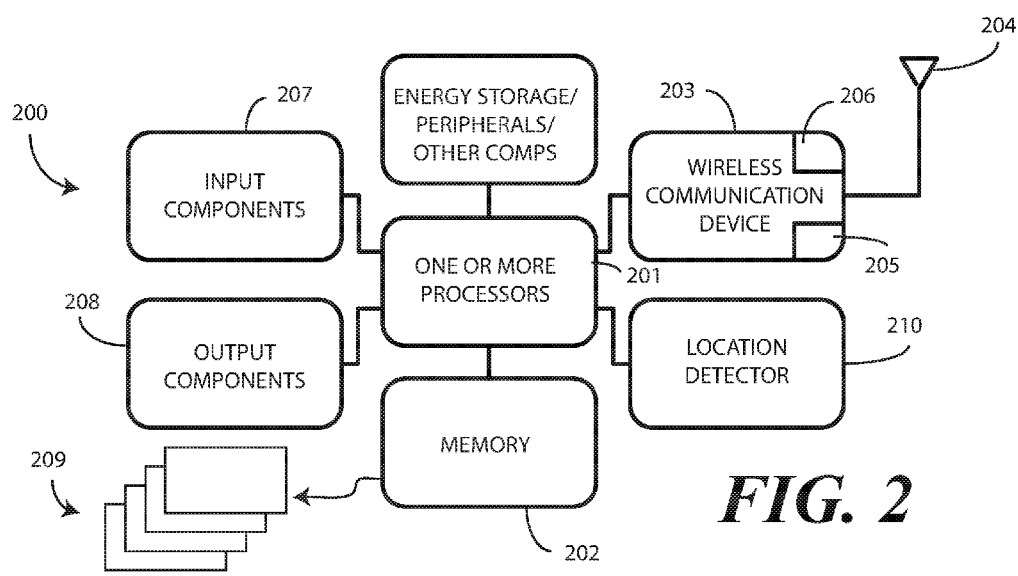
FIG. 2 illustrates one explanatory schematic block diagram in accordance with one or more embodiments of the disclosure.

Turning now to FIG. 2, illustrated therein is a schematic block diagram 200 of an explanatory electronic device (100) configured in accordance with one or more embodiments of the disclosure. In one embodiment, the electronic device includes one or more processors 201. The one or more processors 201 are operable with the display (102) and other components of the electronic devices configured in accordance with embodiments of the disclosure. The one or more processors 201 can include a microprocessor, a group of processing components, one or more ASICs, programmable logic, or other type of processing device. The one or more processors 201 can be operable with the various components of the electronic devices configured in accordance with embodiments of the disclosure. The one or more processors 201 can be configured to process and execute executable software code to perform the various functions of the electronic devices configured in accordance with embodiments of the disclosure.

A storage device, such as memory 202, can optionally store the executable software code used by the one or more processors 201 during operation. The memory 202 may include either or both static and dynamic memory components, may be used for storing both embedded code and user data. The software code can embody program instructions and methods to operate the various functions of the electronic device devices configured in accordance with embodiments of the disclosure, and also to execute software or firmware applications and modules. The one or more processors 201 can execute this software or firmware, and/or interact with modules, to provide device functionality.

In this illustrative embodiment, the schematic block diagram 200 also includes an optional wireless communication circuit 203 that can be configured for wired or wireless communication with one or more other devices or networks. The wireless communication circuit 203 can include wireless communication circuitry, one of a receiver, a transmitter, or transceiver, and one or more antennas 204. In one or more embodiments, the wireless communication circuit 203 is capable of communicating with one or more remote devices across a wide area network, local area network, small local area network (piconet), or personal area networks.

Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. Examples of local area networks include HomeRF, Bluetooth™, and IEEE 802.11 (a, b, g or n) or other similar Wi-Fi networks. Examples of ad hoc peer-to-peer networks include the one-hop and two-hop communication networks, with the former being referred to as a "piconet."

In one or more embodiments, the wireless communication circuit 203 can include a local area network front end 205 and a wide area network communication front end 206. The local area network front end 205 can be configured to communicate using multiple types of local area network communication protocols. For example, the local area network front end 205 can include both a Wi-Fi circuit and another local area wireless communication circuit. The Wi-Fi circuit can, in one embodiment, communicate via an IEEE 802.11 protocol, while the other local area wireless communication circuit can, in one embodiment, communicate with a communication protocol other than the 802.11 standard.

In one or more embodiments, the local area network front end 205 is configured to operate in accordance with a predefined discovery protocol by an electronic device (100) can search for other devices. In one or more embodiments, when operating in a discovery mode using the discovery protocol, the wireless communication circuit 203 can scan for devices that broadcast their identities in accordance with the predefined discovery protocol, i.e., at predefined times, on predefined channels, and in accordance with predefined communication protocol parameters. In one or more embodiments, communications under the predefined discovery protocol occur at the application layer of the stack.

One example of such a communication protocol with such a predefined discovery protocol is the Bluetooth™ communication protocol. When operating in the predefined discovery protocol, Bluetooth™ devices execute one or more steps that include broadcasting a local device name, as well as storing the names of remote devices received in accordance with the protocol. The Bluetooth™ discovery protocol can also include filtering and processing device names. These filtered and/or processed device names can then be further processed by the one or more processors 201 in accordance with one or more method steps.

While Bluetooth™ is one explanatory communication protocol suitable for use with embodiments of the disclosure, embodiments are not so limited. Any local area network communication protocol that includes a predefined device discovery protocol operating at the application layer of the stack can be substituted and used with method steps and system components set forth here. Illustrating by example, in another embodiment the predefined device discovery protocol employs broadcast SSID data in a Wi-Fi network. In yet another embodiment, the predefined device discovery protocol comprises an RFID protocol. Accordingly, other such communication protocols will be obvious to those of ordinary skill in the art having the benefit of this disclosure.

The one or more processors 201 can also be operable with other components. The other components can include input components 207, such as an acoustic detector, microphone, image capture device, or other input device. The input components 207 can also include one or more proximity sensors to detect the presence of nearby objects. The input components 207 may include video input components such as optical sensors, mechanical input components such as buttons, touch pad sensors, touch screen sensors, capacitive sensors, motion sensors, and switches. Similarly, the other components can include output components 208 such as video, audio, and/or mechanical outputs. Other examples of output components 208 include audio output components such as speaker ports or other alarms and/or buzzers and/or a mechanical output component such as vibrating or motion-based mechanisms. The other components may further include an accelerometer to show vertical orientation, constant tilt and/or whether the device is stationary.

A location detector 210 can be operable with the one or more processors 201. In one embodiment, location detector 210 is able to determine location data identifying a location of the electronic device (100). For example, the location can be determined from data received from a constellation of one or more earth orbiting satellites, or from a network of terrestrial base stations to determine an approximate location. Examples of satellite positioning systems suitable for use with embodiments of the present disclosure include, among others, the Navigation System with Time and Range (NAVSTAR) Global Positioning System (GPS) in the United States of America, the Global Orbiting Navigation System (GLONASS) in Russia, and other similar satellite positioning systems. The satellite positioning systems based location fixes of the location detector 210 autonomously or with assistance from terrestrial base stations, for example those associated with a cellular communication network or other ground based network, or as part of a Differential Global Positioning System (DGPS), as is well known by those having ordinary skill in the art. The location detector 210 may also be able to determine location by locating or triangulating terrestrial base stations of a traditional cellular network, such as a CDMA network or GSM network, or from other local area networks, such as Wi-Fi networks.

In one or more embodiments, the location detector 210 receives location information corresponding to the electronic device from one or more terrestrial networks or GPS satellites. The process can repeat, with the location detector 210 receiving updated location information as the electronic device (100) moves. Upon receiving information corresponding to movement of the electronic device, the one or more processors 201 can determine bearing. Additionally, other information such as navigation route can be inferred as well.

In one or more embodiments, the location detector 210 can be operable to access map information as well. The map information can be stored locally within a memory 202. Alternatively, the location detector 210 may access map information from a remote server across a network using the wireless communication circuit 203.

The one or more processors 201 can be responsible for performing the primary functions of the electronic devices configured in accordance with one or more embodiments of the disclosure. Executable software code used by the one or more processors 201 can be configured as one or more modules 209 that are operable with the one or more processors 201. Such modules 209 can store instructions, control algorithms, and so forth.

In one embodiment, the one or more processors 201 are responsible for running the operating system environment of the electronic device (100). The operating system environment can be configured as executable code operating on one or more processors 201 or control circuits of the electronic device (100). The operating system environment can include a kernel, one or more drivers, and one or more layers of a protocol stack. These layers can include an application service layer, a network layer, a physical layer, a protocol layer, an application layer, and other layers, such as an anticollision layer and a transfer layer. Each layer can operate in accordance with one or more activity parameters.

In one embodiment, the physical layer is the top-level layer of the protocol stack, known as "layer 1," with the other layers above the physical layer. For example, in one embodiment the protocol stack includes the physical layer as the top layer, a data link layer as the second layer, the network layer as layer three, a transport layer as the fourth layer, a session layer as the fifth layer, the presentation layer as the sixth layer, and an application layer as the seventh layer.

As noted above, in one or more embodiments the one or more processors 201 can cause the wireless communication circuit 203 to execute a discovery protocol to establish ad hoc peer-to-peer network communications at the application layer. In one embodiment, the one or more processors 201 only execute a discovery protocol to establish ad hoc peer-to-peer network communications at the application layer.

The application layer can be responsible for executing application service modules. The application service modules may support one or more applications or "apps." Examples of such applications shown include a near-field communication application for near-field wireless communication applications, a cellular telephone application for making voice telephone calls, a web browsing application configured to allow the user to view webpages, an electronic mail application configured to send and receive electronic mail, a photo application configured to permit the user to view images or video, and a camera application configured to capture still (and optionally video) images. These applications are illustrative only, as others will be obvious to one of ordinary skill in the art having the benefit of this disclosure.

The one or more processors 201 can be configured to one or more of launch one of the apps and/or enable data communication with one of the apps. In one or more embodiments, the one or more processors 201 are responsible for managing the applications and all data communications of the electronic device (100). Accordingly, the one or more processors 201 can be responsible for launching, monitoring and killing the various applications and the data communication with the various applications in response to receipt of messages, data payloads, and so forth as described above. The applications of the application layer can be configured as clients of the application service layer to communicate with services through APIs, messages, events, or other inter-process communication interfaces.

As will be described below, in one or more embodiments an API is defined during a pairing process to establish a reduced power discovery flag. This reduced power discovery flag can be marked through an APP or by a user via an API. Other techniques will be obvious to those of ordinary skill in the art having the benefit of this disclosure. In one or more embodiments, when the reduced power discovery flag is marked, set, or otherwise enabled, the one or more processors 201 cause the wireless communication circuit 203 to transmit device discovery beacons and execute other operations at a reduced signal strength. Examples of how this occurs will be described in more detail below with reference to FIGS. 3-8.

It is to be understood that the electronic device (100) of FIG. 1 and the schematic block diagram 200 of FIG. 2 Are provided for illustrative purposes only and for illustrating components of explanatory electronic devices configured in accordance with one or more embodiments of the disclosure. Neither figure is intended to represent a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
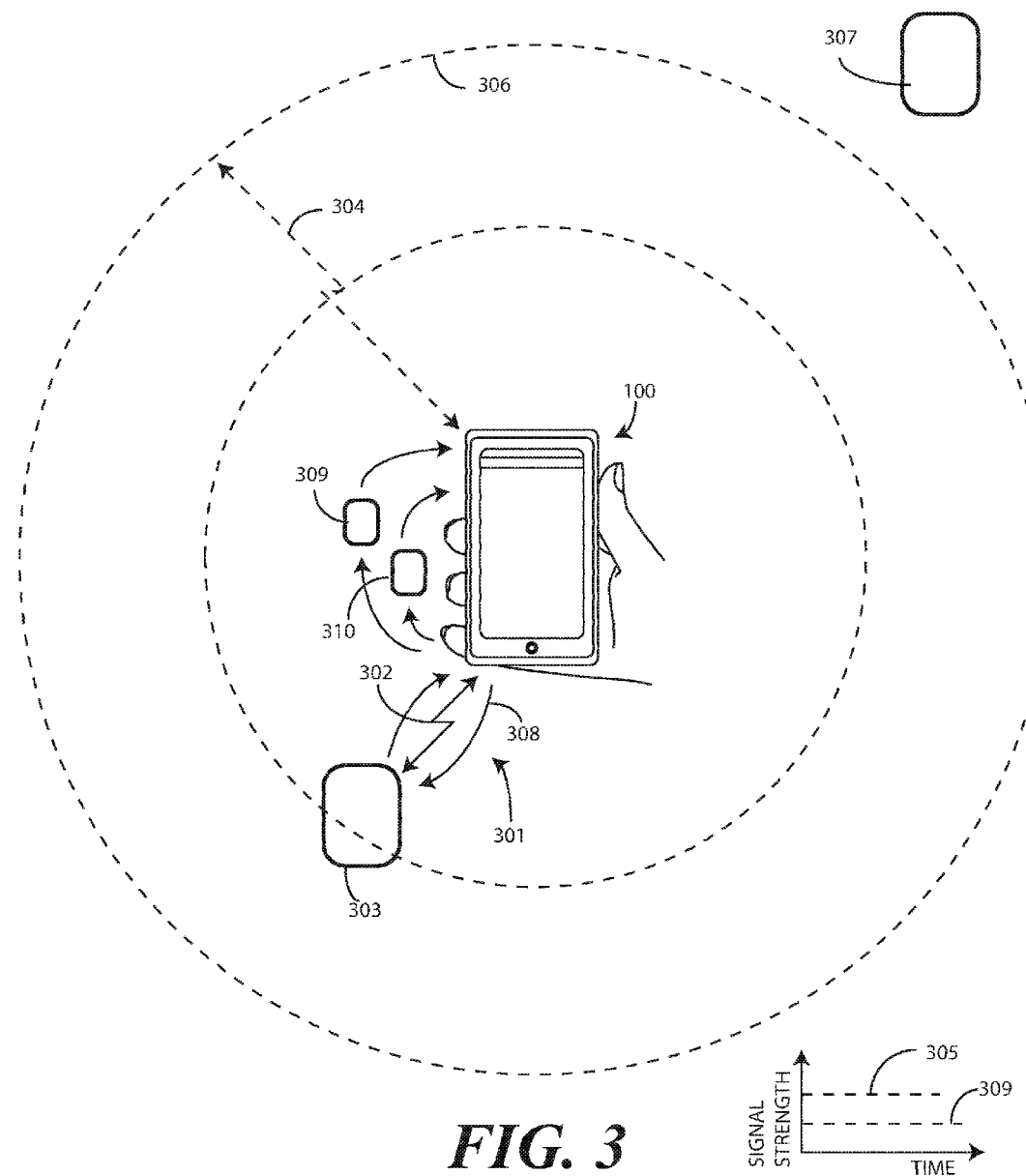
FIG. 3 illustrates one explanatory electronic device, operating in accordance with one or more method steps, each in accordance with one or more embodiments of the disclosure.

Turning now to FIG. 3, illustrated therein is the electronic device 100 executing one or more method steps in accordance with one or more embodiments of the disclosure. One or more processors (201) of the electronic device 100 cause the wireless communication circuit (203) to engage in a pairing procedure 301 to establish a peer-to-peer wireless communication link 302 with a second electronic device 303. In one or more embodiments, the peer-to-peer wireless communication link 302 is established using a predefined communication protocol, such as Bluetooth™, defined by a predefined plurality of communication protocol parameters.

In one or more embodiments, the pairing procedure 301 occurs when the electronic device 100 transmits a device discovery beacon 304. In one embodiment, the device discovery beacon 304 broadcasts a local name, such as a MAC address, of the electronic device 100 using a discovery protocol of the predefined communication protocol.

Illustrating by example, where the predefined communication protocol is the Bluetooth Low Energy™ protocol, the discovery protocol can include data needed to identify a mobile device, including, e.g., a device class, device manufacturer, and/or serial number. The device name may have a common name or nickname, a public session initiation protocol uniform resource identifier, and/or a device identifier such as an International Mobile Equipment Identity (IMEI) number. The device name may be in a predefined format set forth by the predefined communication protocol. Moreover, the device name may be encoded using a coding protocol.

In one or more embodiments, the wireless communication circuit (203) of the electronic device 100 has associated therewith a maximum signal strength threshold 305 defining a maximum signal strength at which the device discovery beacon 304 can be transmitted. This maximum signal strength threshold 305 defines a proximity limit 306 within which wireless communications can reliably occur.

In one or more embodiments, the electronic device 100 initially transmits the device discovery beacon 304 at the maximum signal strength. Accordingly, devices 303 within the proximity limit 306 are discoverable. However, devices 307 outside of this proximity limit 306 will not be discoverable.

In one or more embodiments, device discovery beacon 304 is periodically transmitted. For example, the device discovery beacon 304 can be transmitted M times a second, where M is a number, with a non-propagating signal burst sequence centered at around 125 kHz.

The second electronic device 303 and the electronic device 100 then engage in various data transactions during the pairing procedure 301. For example, in response to receipt of the device discovery beacon 304, the second electronic device 303 can respond, initiating thereafter with a bi-directional data exchange to establish the peer-to-peer wireless communication link 302 with the second electronic device 303. The second electronic device 303 may transmit an acknowledgement (ACK) signal to begin the pairing procedure. Each device may exchange communication capabilities. The data exchange can includes transmission of a random binary number, such as a 128-bit number or a 256-bit number for use as a link key. Authorization codes, cyclic redundancy checks (CRC), and other information can be exchanged as well.

Other data exchanges occurring during pairing procedures will be obvious to those of ordinary skill in the art having the benefit of this disclosure. For example, communication protocol parameters such as passwords, a network identifiers, authentication keys, authentication request information, authentication verification information, or other data that is used for communication can be exchanged. Similarly, minimum connection interval information, maximum connection interval information, slave latency, timeout multipliers, and so forth can be exchanged. The data exchanges can also include supervision advertising minimal intervals, supervision advertising maximum intervals, and supervision timeout parameters. Still additional communication protocol parameters can include passkeys, security keys, reserve parameters, security parameters, and so forth.

In one or more embodiments, during the pairing procedure 301, the electronic device 100, with its wireless communication circuit (203) and/or one or more other components such as the one or more processors (201) makes measurements to determine a minimum signal strength 308 of wireless communication signals required to establish the peer-to-peer wireless communication link 302. The measurement process, in general, includes taking a first set of received signal strength measurements for a first set of signals received from the second electronic device 303. In one embodiment, the measurements are RSS measurements. In other embodiments, the measurements can be RSSI measurements. In other embodiments, the measurement can be actual transmit power measurements. In still other embodiments, the measurements can be a RSRP measurements. Other measurements will be obvious to those of ordinary skill in the art having the benefit of this disclosure.

As used herein, RSS is the power of a wireless signal as measured by a device receiving the signal and can be expressed in dBm or milliwatts. Actual transmit power is the power at which a wireless signal is transmitted, and can be expressed in dBm or milliwatts. The phrases "transmit power" and "actual transmit power" are used herein interchangeably. The RSS measurement can be of any suitable signal, for instance, a RSSI measurement of a broadcasted WiFi beacon or RSRP measurement of a LTE signal.

Thus, in one or more embodiments, the electronic device 100 makes received or transmitted signal strength measurements of the wireless communication signals from the second electronic device 303 to establish a pairing power signal strength threshold 309. This pairing power signal strength threshold 309 can be stored in a memory (202) of the electronic device 100. In one or more embodiments, the one or more processors (201) of the electronic device 100 can optionally also establish a reduced power discovery flag 310 that can be stored in the memory (202) of the electronic device 100. In one embodiment, setting the reduced power discovery flag 310 causes the electronic device 100 to be placed in a reduced power device discovery mode.

In one or more embodiments, during this procedure, i.e., when the second electronic device 303 and the electronic device 100 engage in the various data transactions during the pairing procedure 301 and the electronic device 100 makes measurements to determine a minimum signal strength 308 of wireless communication signals required to establish the peer-to-peer wireless communication link 302, certain conditions are imposed. Illustrating by example, in one embodiment each of the electronic device 100 and the second electronic device 303 are instructed to execute a particular task or feature so that a baseline operation is occurring in both the electronic device 100 and the second electronic device 303 while the measurements are made. For instance, in one embodiment, both the electronic device 100 and the second electronic device 303 are executing a particular application. In another embodiment, both the electronic device 100 and the second electronic device 303 are executing a particular communication protocol. This provides for more consistent operating conditions during the measurement.

In other embodiments, the electronic device 100 makes the measurements to establish the pairing power signal strength threshold 309, it can set flags to instruct the second electronic device 303 to enter predefined modes of operation the next time communication is established at the pairing power signal strength threshold 309. For example, in one embodiment when the electronic device 100 and the second electronic device 303 establish communication at the pairing power signal strength threshold 309, one or both devices can perform operations or tasks such as locking operations, unlocking operations, informational access restriction operations, and so forth. Effectively, discovery of the second electronic device 303 by the electronic device 100 at the pairing power signal strength threshold 309 can serve as a contextual event for the second electronic device 303 to act upon.

As noted above, once the pairing power signal strength threshold 309 is determined, in one or more embodiments it can be compensated, i.e., increased or decreased by a predetermined amount, as a function of one or more factors. Illustrating by example, if the electronic device 100 is a router, it may adjust the pairing power signal strength threshold 309 as a function of one or more of the following: a number of connected devices, the received signal strength from each connected device, the data exchange activity levels of each device, the exact or relative location of each device, any interference that may be seen in peer-to-peer communication links with these devices, and so forth. For instance, the router may select the measured signal strength of the farthest device with the most interference, and increase the power level needed to communicate with that particular device by ten percent to establish the pairing power signal strength threshold 309 for the other devices coupled to the router in the infrastructure mode.

Figure 4:
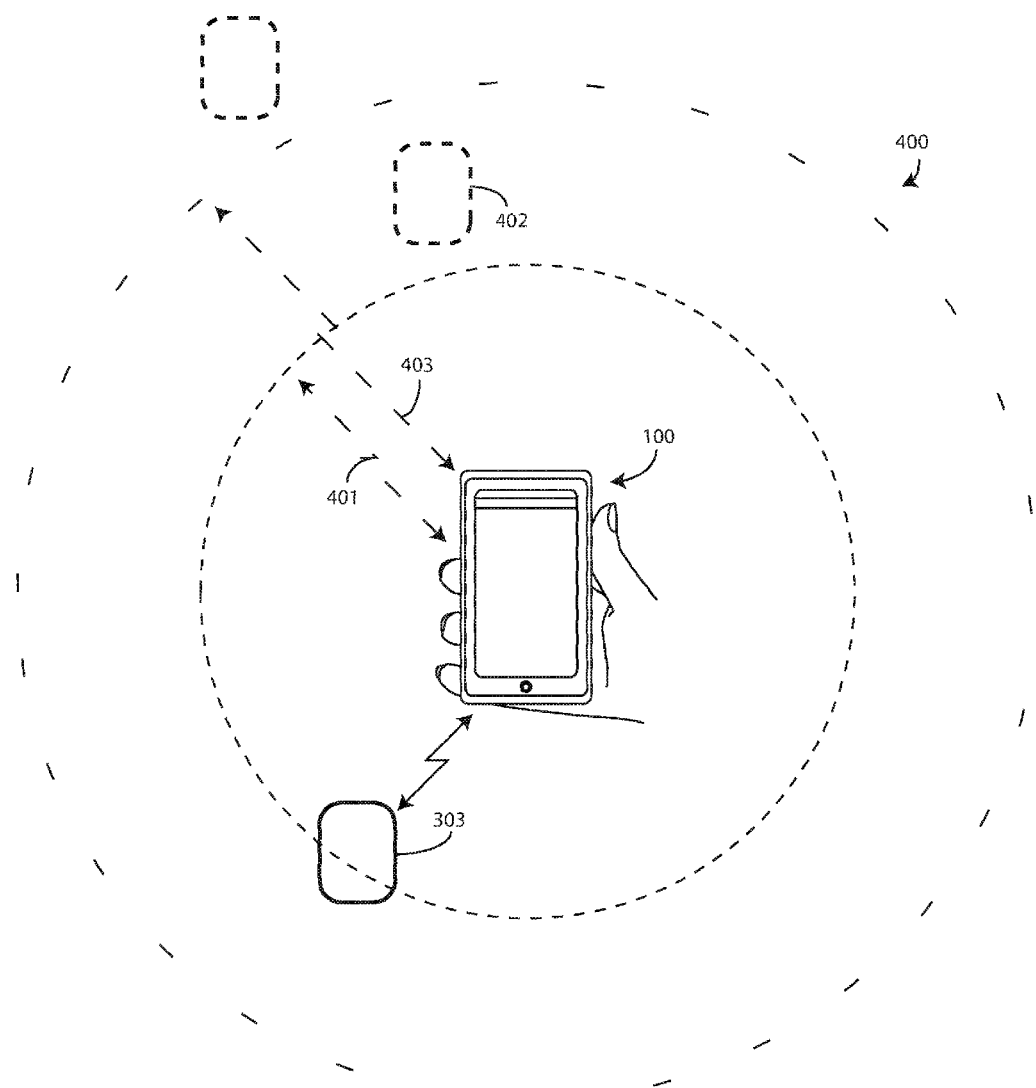
FIG. 4 illustrates one explanatory electronic device, operating in accordance with one or more method steps, each in accordance with one or more embodiments of the disclosure.

Turning now to FIG. 4, illustrated therein is the electronic device 100 operating in the reduced power device discovery mode 400. In one or more embodiments, when the electronic device 100 is operating in the reduced power device discovery mode 400, the one or more processors (201) of the electronic device 100 cause the wireless communication circuit (203) to transmit a device discovery beacon 401 at a signal strength that is equal to or less than the pairing power signal strength threshold (309). In one embodiment, this results in the transmission of a device discovery beacon 401 having a signal strength equal to or less than the minimum signal strength required to pair the electronic device 100 with the second electronic device 303. In one or more embodiments, the one or more processors (201) cause the wireless communication circuit (203) to transmit the device discovery beacon 401 at this reduced signal strength only when the reduced power discovery flag (310) is set.

Effectively, when this occurs, the electronic device 100 scans for other electronic devices at a signal strength that is less than the maximum signal strength threshold (305), thereby consuming power. Here, the electronic device 100 scans for other devices at the power level used to pair to the second electronic device 303. This reduces power, thereby extending the run time of the electronic device 100.

The reduced power scanning, however, comes at a tradeoff Devices 402 that would ordinarily be discoverable when the wireless communication circuit (203) transmits at the maximum signal strength are no longer discoverable. Advantageously, in one or more embodiments the wireless communication circuit (203) periodically transmits a device discovery beacon 403 at the maximum signal strength threshold (305) so that such devices 402 can be discovered despite the fact that the electronic device 100 is operating in the reduced power device discovery mode 400.

In one or more embodiments, the one or more processors (201) of the electronic device 100 cause the wireless communication circuit (203) to periodically transmit the device discovery beacon 403 at a maximum signal strength threshold (305) at a frequency less than that of transmissions of the device discovery beacon 401 at the minimum signal strength, i.e., at a signal strength equal to or less than the pairing power signal strength threshold (309). Said differently, in one or more embodiments, the device discovery beacon 403 transmitted at the maximum signal strength threshold (305) less often than the device discovery beacon 401 is transmitted with a signal strength that is less than or equal to the pairing power signal strength threshold (309).

Illustrating by example, in one embodiment the device discovery beacon 401 transmitted with a signal strength that is less than or equal to the pairing power signal strength threshold (309) is transmitted periodically N times a second, where N is one of a number or an integer. By contrast, the device discovery beacon 403 transmitted at the maximum signal strength threshold (305), which is also known as a "heartbeat," is transmitted periodically M times per second, where M is one of a number or an integer that is less than N. Accordingly, the device discovery beacon 401 transmitted with a signal strength that is less than or equal to the pairing power signal strength threshold (309) may be transmitted, say, every twenty milliseconds while the device discovery beacon 403 transmitted at the maximum signal strength threshold (305) is transmitted once a second or every two seconds. Other examples of M and N will be obvious to those of ordinary skill in the art having the benefit of this disclosure.

Figure 5:
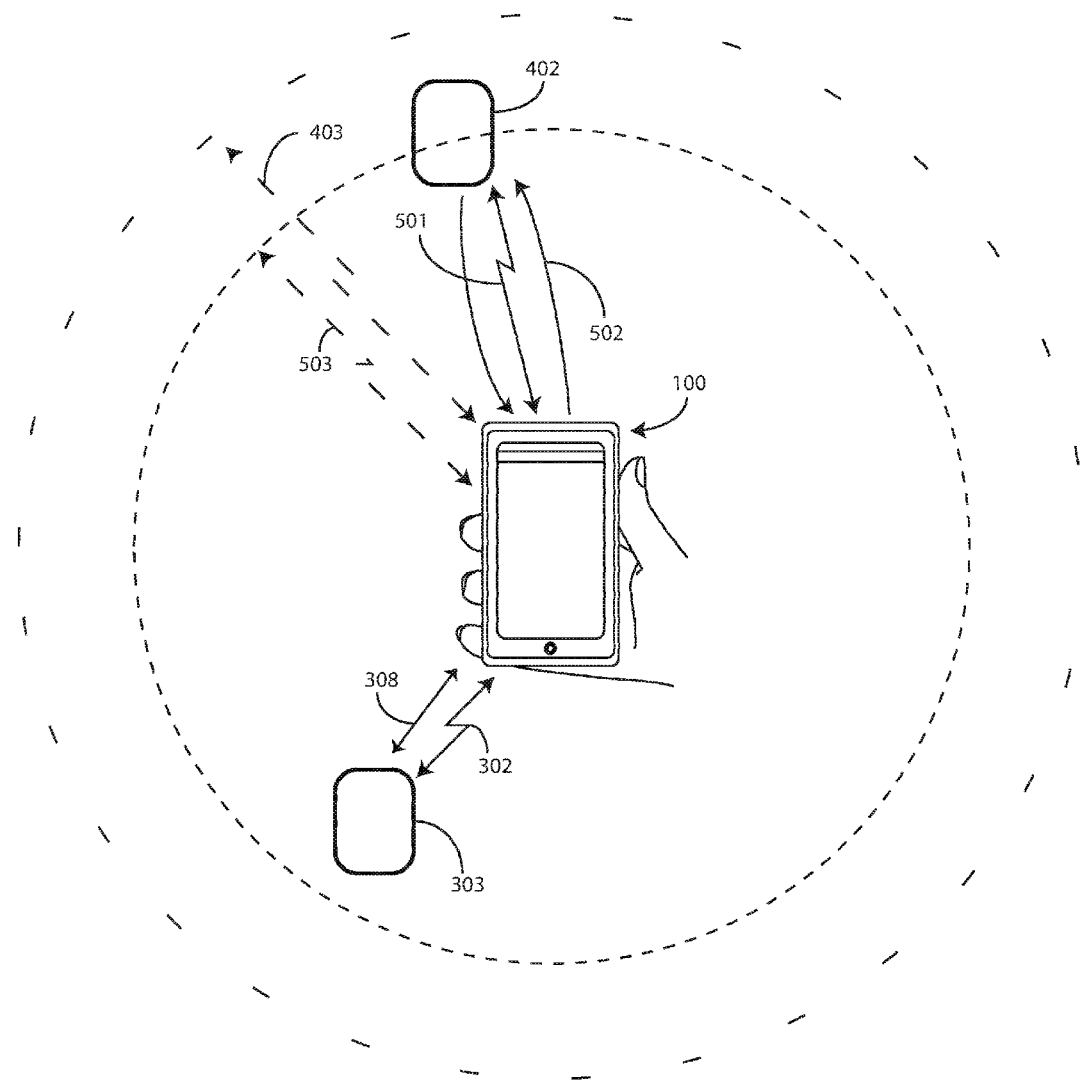
FIG. 5 illustrates one explanatory electronic device, operating in accordance with one or more method steps, each in accordance with one or more embodiments of the disclosure.

Turning now to FIG. 5, device 402 has been discovered while transmitting the heartbeat at the maximum signal strength. Said differently, device 402, which is a third electronic device, is discovered while transmitting the device discovery beacon 403 at the maximum signal strength. In one embodiment, the one or more processors (201) of the electronic device 100 cause the wireless communication circuit (203) to establish another peer-to-peer wireless communication link 501 with this device 402. The establishment of the other peer-to-peer wireless communication link 501 can occur as previously described in one or more embodiments. Alternatively, where the peer-to-peer wireless communication link 501 is different from the peer-to-peer wireless communication link 302 with the second electronic device 303, a different communication protocol can be used. If, for example, peer-to-peer wireless communication link 501 was an RFID communication link, while peer-to-peer wireless communication link 302 is a Bluetooth communication link, the discovery and handshaking procedures would be different for peer-to-peer wireless communication link 501 than peer-to-peer wireless communication link 302, and so forth.

When establishing peer-to-peer wireless communication link 501 with device 402, in one or more embodiments electronic device 100 can determine another minimum signal strength 502 required to establish peer-to-peer wireless communication link 501 with device 402. Where this minimum signal strength 502 is greater than the minimum signal strength 308 required to establish the peer-to-peer wireless communication link 302 with the second electronic device 303, in one embodiment the one or more processors (201) of the electronic device 100 can cause the wireless communication circuit (203) to increase the pairing power signal strength threshold (309) to the minimum signal strength 502 required to establish peer-to-peer wireless communication link 501 with device 402. Accordingly, future device discovery beacons 503 and other communication activities can occur at the increased pairing power signal strength threshold to maintain communications with both the second electronic device 303 and the third electronic device, i.e., device 402. As before, the heartbeat defined by device discovery beacon 403 can be transmitted at periodic intervals as well.

Figure 6:
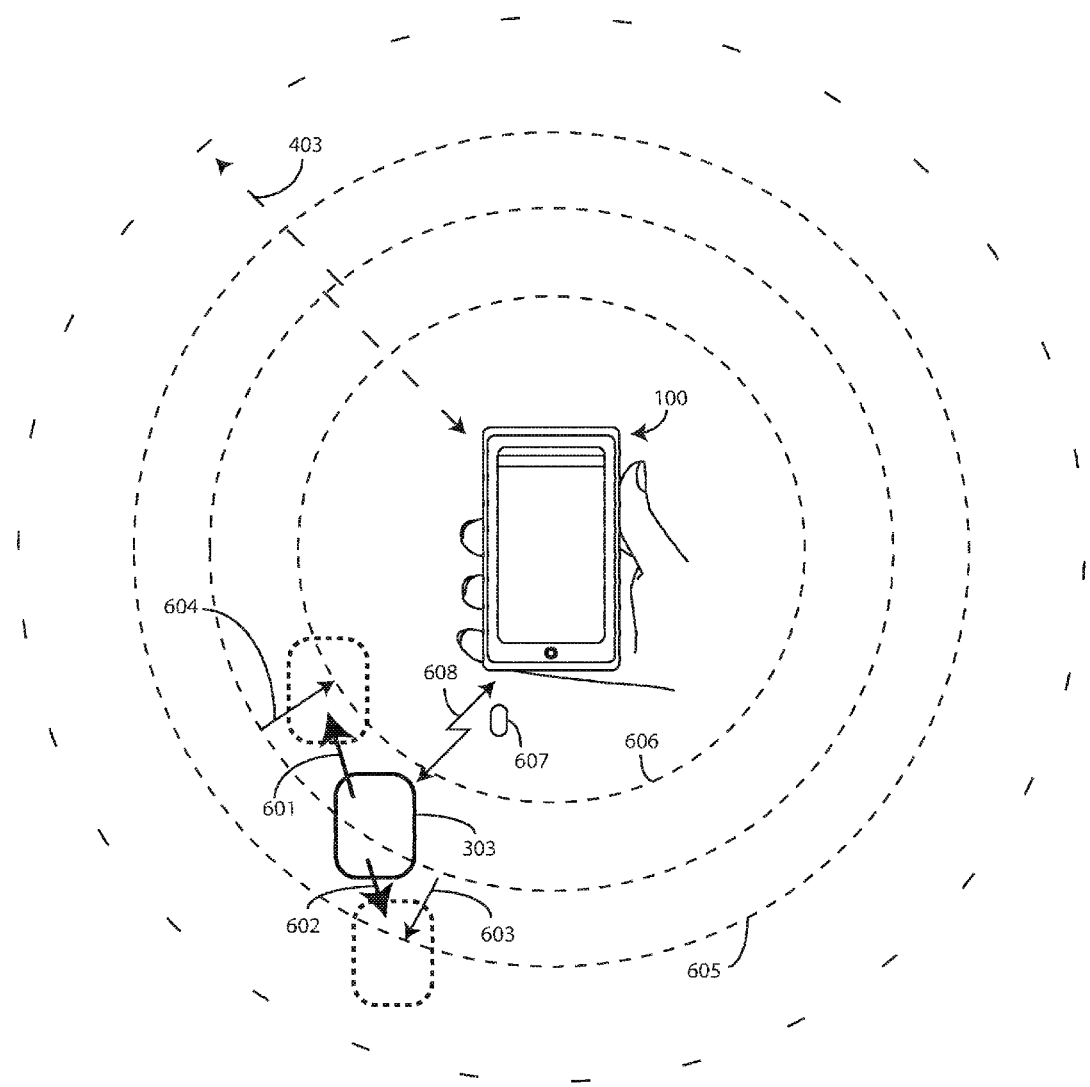
FIG. 6 illustrates one explanatory electronic device, operating in accordance with one or more method steps, each in accordance with one or more embodiments of the disclosure.

The pairing power signal strength threshold (309) can be adjusted in other ways as well. Turning now to FIG. 6, when the second electronic device 303 moves, a pairing power signal strength threshold (309) adjustment may be warranted as well. Examples of pairing power signal strength threshold (309) adjustments when the second electronic device 303 moves closer to, and farther from, the electronic device 100 are each shown in FIG. 6.

In one or more embodiments, when the one or more processors (201) of the electronic device 100 detect movement of the electronic device relative to the second electronic device 303, the pairing power signal strength threshold (309) can be adjusted. For example, if the electronic device 100 and the second electronic device 303 move 601 closer together, in one embodiment the pairing power signal strength threshold (309) can be reduced. By contrast, where the electronic device 100 and the second electronic device move 602 further apart, in one embodiment the pairing power signal strength threshold 309 can be increased.

That the electronic device 100 and the second electronic device 303 have moved 601,602 closer together or farther apart can be determined in various ways. In one simple embodiment, the location detector (210) of the electronic device 100 can detect a change in location, as well as how much the location has changed. Accordingly, in one or more embodiments, the one or more processors (201) of the electronic device 100 can increase 603 the minimum signal strength 605 by adjusting the pairing power signal strength threshold (309) upon detecting, with the location detector (210) of the electronic device 100, physical separation of the electronic device 100 and the second electronic device 303. Similarly, in one or more embodiments the one or more processors (201) of the electronic device 100 can decrease 604 the minimum signal strength 606 by adjusting the pairing power signal strength threshold (309) upon detecting, with the location detector (210) of the electronic device 100, physical motion of the electronic device 100 toward the second electronic device 303.

In other embodiments, a change in relative distance can be detected through a data exchange 607 between the electronic device 100 and the second electronic device 303. For example, the wireless communication circuit (203) can communicate with the second electronic device 303 on the peer-to-peer wireless communication link 608 at the pairing power signal strength threshold (309), and can perform the data exchange 607 to determine a physical location of the second electronic device 303. The electronic device 100 can detect, with a location detector (210) operable with the one or more processors (201), movement of the electronic device 100, and one of reduce the pairing power signal strength threshold (309) when the movement is toward the physical location, or increase the pairing power signal strength threshold (309) when the movement is away from the physical location In one or more embodiments the second electronic device 303 may include its own location detector. Accordingly, when the second electronic device 303 is moving, it may alert the electronic device 100 to this fact through the data exchange 607. Said differently, the electronic device 100 may communicate, with the wireless communication circuit (203), with the second electronic device 303 on the peer-to-peer wireless communication link 608 at the pairing power signal strength threshold (309) and receive, with the wireless communication circuit (203) on the peer-to-peer wireless communication link 608, data indicating that a physical location of the second electronic device 303 has changed. Where the physical location is farther from the electronic device 100, the one or more processors (201) can increase the pairing power signal strength threshold (309). By contrast, where the physical location is nearer to the electronic device 100, the one or more processors (201) can decrease the pairing power signal strength threshold (309).

Thus, in one or more embodiments, the one or more processors (201) of the electronic device 100 can increase 603 the minimum signal strength 605 by adjusting the pairing power signal strength threshold (309) upon detecting, from the data exchange 607, physical separation of the electronic device 100 and the second electronic device 303. Similarly, in one or more embodiments the one or more processors (201) of the electronic device 100 can decrease 604 the minimum signal strength 606 by adjusting the pairing power signal strength threshold (309) upon detecting, from the data exchange 607, physical motion of the electronic device 100 toward the second electronic device 303.

In still other embodiments, especially where the electronic device 100 is communicating with multiple other devices in a group (as was the case in FIG. 5) the one or more processors (201) of the electronic device 100 can detect either location or motion from a location from the peer-to-peer wireless communication link 608 itself. In one or more embodiments, the electronic device 100 makes a first set of received signal strength measurements for a first set of signals received from the second electronic device 303 (or if there are multiple devices, from at least one device in the group) and recording a first set of time stamps that indicate when the first set of received signal strength measurements were taken. A set includes one or more elements.

The electronic device 100 can then send the first set of received signal strength measurements and corresponding first set of time stamps to the remaining peer-to-peer devices in the group. The electronic device 100 can then receive a second set of received signal strength measurements taken by the remaining peer-to-peer devices and a second set of time stamps that indicate when the second set of received signal strength measurements were taken. The electronic device 100 can then determine relative location by correlating the measurements in the first and second sets of received signal strength measurements using the first and second sets of time stamps to define constraints on distances between pairs of devices in the group of devices.

The unknown positioning coordinates can be further determined using known positioning coordinates of multiple devices in the group of devices. Beneficially, the second set of received signal strength measurements can include measurements taken by one or more of the remaining peer-to-peer devices of signals sent by one or more of the other remaining peer-to-peer devices, which improves the accuracy of the location estimations.

The correlation of the measurements can include identifying, for multiple pairs of devices some of which include the first peer-to-peer device, a correlation between: (1) a RSS measurement taken by one peer-to-peer device in the pair of a signal transmitted by the other peer-to-peer device in the pair; and (2) a transmit power recorded for the a signal transmitted by the other peer-to-peer device. For each pair of devices, distance between the pairs of devices is constrained based on the correlated RSS measurements and transmit powers.

Alternatively, the correlation can include comparing the first set of time stamps and the second set of time stamps to identify received signal strength measurements that overlap in time. For one example, the overlapping measurements are taken for a signal sent from the first peer-to-peer device and are taken by two or more of the other peer-to-peer devices, and constraints on distances between the first peer-to-peer device and the two or more of the other peer-to-peer devices are defined using the overlapping measurements. For another example, the overlapping measurements are taken for a signal sent from a second peer-to-peer device and are taken by two or more of the other peer-to-peer devices, and constraints on distances between the second peer-to-peer device and the two or more of the other peer-to-peer devices are defined using the overlapping measurements.

As such, equation/function (1) below can be used to calculate Euclidian distance (d) between two devices with Cartesian coordinates (x1, y1) and (x2, y2), $$d=[(x2-x1)^2+(y2-y1)^2]^{1/2}. \qquad (1)$$

When the distance is known or estimated, a system of equations each derived from equation (1) can be used to solve for unknown positioning coordinates or, in other words, positioning coordinates (or simply coordinates) of non-anchor devices. In other embodiments, a suitable system of equations can be determined based on a similar known distance equation applicable to a three-dimensional Cartesian coordinate system. In further embodiments, other positioning coordinate representations, e.g., latitude and longitude, are translated into Cartesian coordinates and the embodiments applied.

Accordingly, in one or more embodiments, the one or more processors (201) of the electronic device 100 can increase 603 the minimum signal strength 605 by adjusting the pairing power signal strength threshold (309) upon detecting, from the peer-to-peer wireless communication link 608 and associated measurements and time stamps, physical separation of the electronic device 100 and the second electronic device 303. Similarly, in one or more embodiments the one or more processors (201) of the electronic device 100 can decrease 604 the minimum signal strength 606 by adjusting the pairing power signal strength threshold (309) upon detecting, from the peer-to-peer wireless communication link 608 and associated measurements and time stamps, physical motion of the electronic device 100 toward the second electronic device 303.

Regardless of how motion between the electronic device 100 and the second electronic device 303 is detected, the heartbeat can still occur as the pairing power signal strength threshold (309) is adjusted. Said differently, the device discovery beacon 403 transmitted at the maximum signal strength threshold (305) can be is transmitted periodically as previously described.

Figure 7:
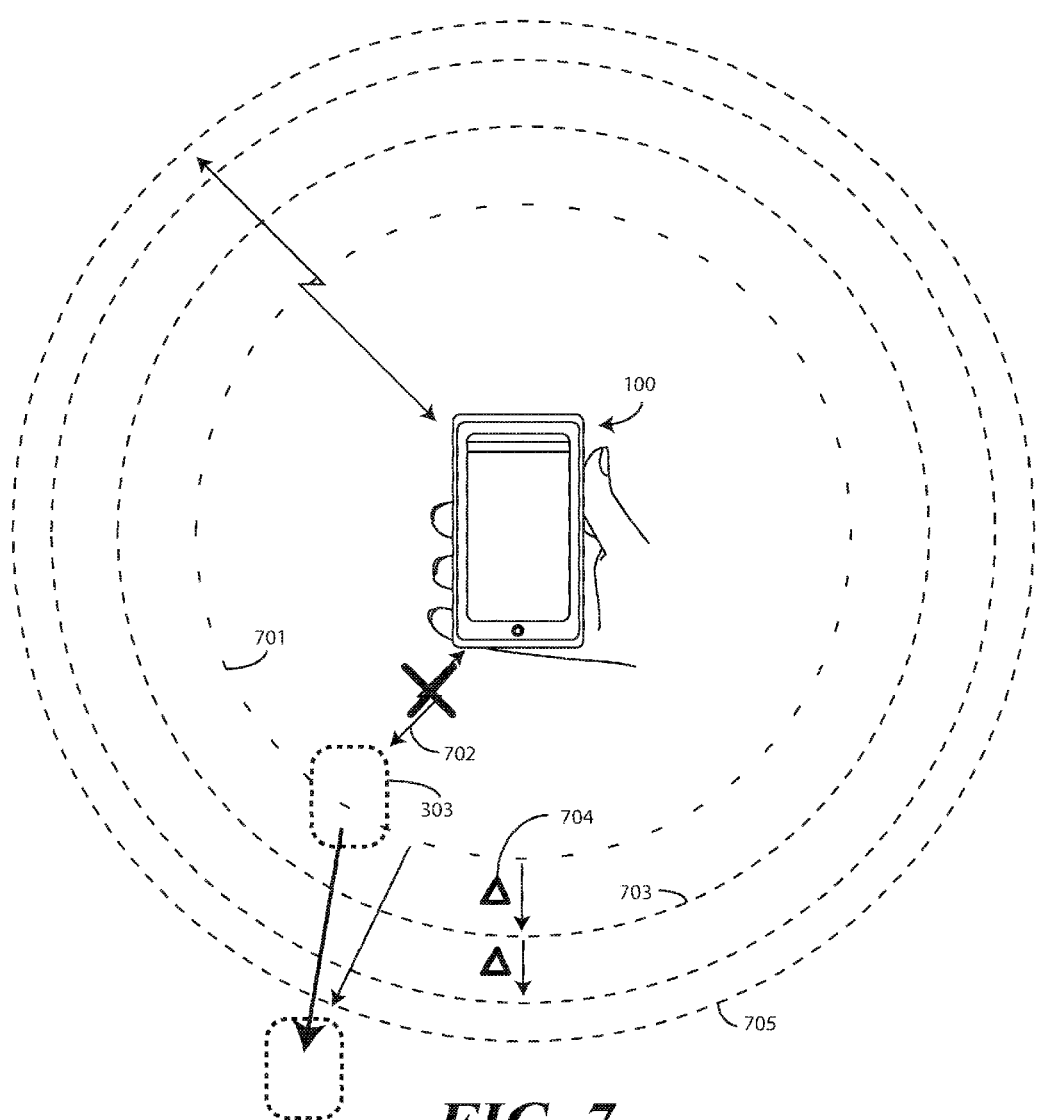
FIG. 7 illustrates one explanatory electronic device, operating in accordance with one or more method steps, each in accordance with one or more embodiments of the disclosure.

Turning now to FIG. 7, illustrated therein is yet another way to adjust the minimum signal strength 701 when there is movement of one of the electronic device 100, the second electronic device 303 or combinations thereof. Where the electronic device is communicating with a minimum signal strength 701 defined by the pairing power signal strength threshold (309) and the distance between the electronic device 100 and the second electronic device 303 increases, the peer-to-peer wireless communication link 702 therebetween will likely fail. This is true because the minimum signal strength 701 may be insufficient for reliable data exchange after the separation between the electronic device 100 and the second electronic device 303.

Accordingly, in one or more embodiments the one or more processors (201) of the electronic device 100 selectively increase the minimum signal strength 701 corresponding to the pairing power signal strength threshold (309) whenever the peer-to-peer wireless communication link 702 between the electronic device 100 and the second electronic device 303 fails. This can occur in various ways.

In one or more embodiments, the one or more processors (201) of the electronic device 100, upon cessation of the peer-to-peer wireless communication link 702, increase the pairing power signal strength threshold (309) to increase the minimum signal strength 701 by a predetermined signal strength adjustment threshold 704. In one or more embodiments, the predetermined signal strength adjustment threshold 704 is an amount that is less than a difference between the maximum signal strength threshold (305) and the pairing power signal strength threshold (309). Accordingly, the one or more processors (201) of the electronic device 100 increase the pairing power signal strength threshold (309) in increments to keep transmitted power to a minimum.

Alternatively, in other embodiments, the one or more processors (201) of the electronic device 100 can simply, upon failing to communicate with the second electronic device 303, increase the minimum signal strength 701 to the maximum signal strength 705 of the peer-to-peer wireless communication link 702. Said differently, in one embodiment, upon cessation of the peer-to-peer wireless communication link 702, the one or more processors (201) of the electronic device 100 can remove the wireless communication circuit (203) from the reduced power device discovery mode, e.g., by deactivating the reduced power discovery flag (310), and increase the pairing power signal strength threshold (309) to the maximum signal strength 705. Other techniques will be obvious to those of ordinary skill in the art having the benefit of this disclosure.

Figure 8:
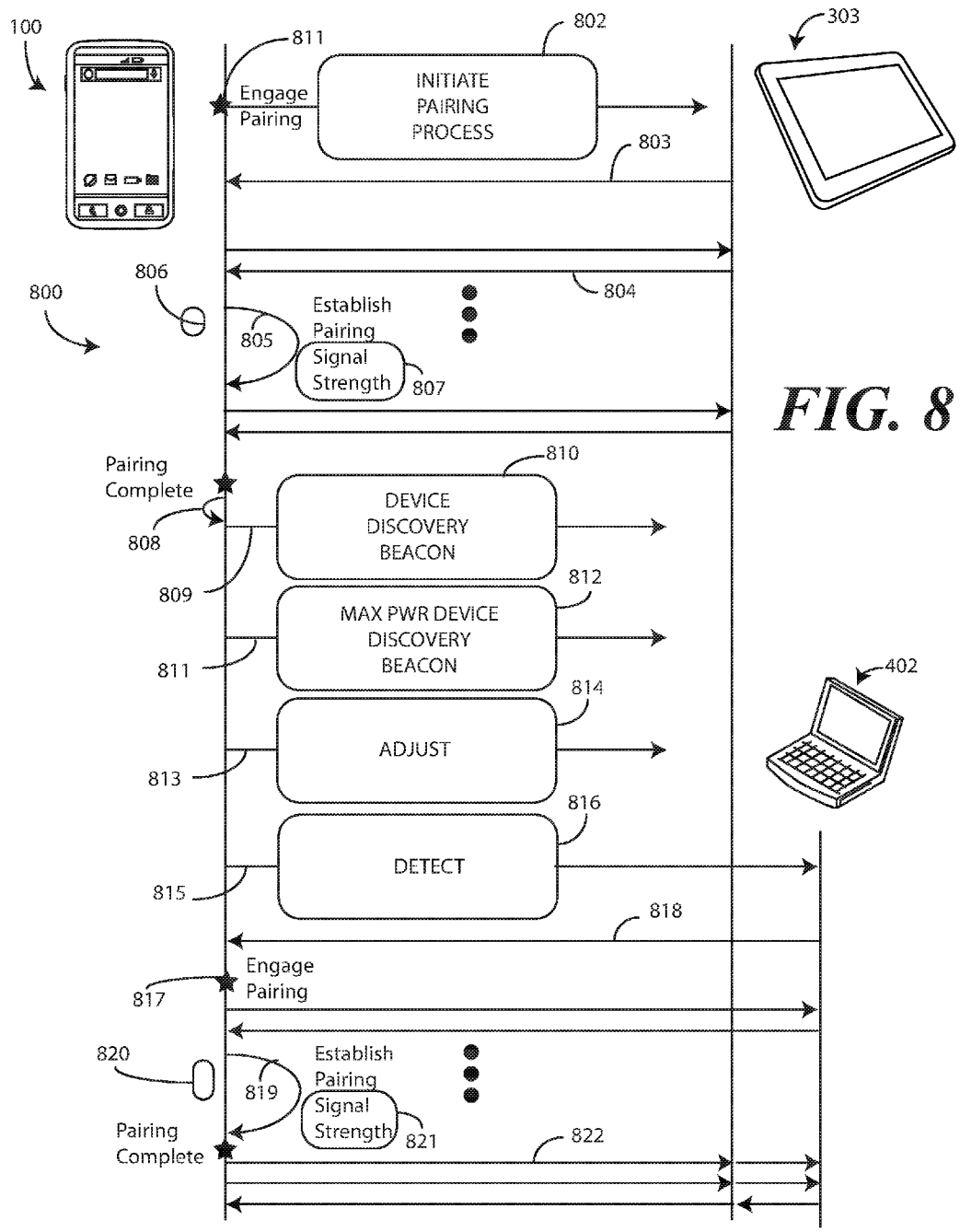
FIG. 8 illustrates one explanatory signal flow diagram of one or more methods in accordance with one or more embodiments of the disclosure.

Turning now to FIG. 8, illustrated therein is an explanatory signal flow diagram 800 illustrating one or more method steps in accordance with one or more embodiments of the disclosure. Most all of the method steps have been described above with reference to FIGS. 3-7. However, FIG. 8 provides a concise picture of multiple steps to aid in facilitating understanding of embodiments of the disclosure.

Shown in FIG. 8 are an electronic device 100, a second electronic device 303, and a third electronic device 402. It should be noted that while only three electronic devices are shown, the method steps illustrated in FIG. 8 can be extended to cover ecosystems where many electronic devices are all in communication.

At step 801, a wireless communication circuit (203) of the electronic device 100 engages in a pairing procedure 802 to establish a peer-to-peer wireless communication link with the second electronic device 303. In one embodiment, this engagement begins when a device discovery beacon is transmitted to the second electronic device 303.

During the pairing process, a data exchange between the electronic device 100 and the second electronic device 303 occurs as previously described. Accordingly, during the pairing process, the electronic device 100 receives 803, with its wireless communication circuit (203), one or more wireless communication signals 804 from the second electronic device 303.

In one or more embodiments, at step 805, the one or more processors (201) and/or wireless communication circuit (203) of the electronic device 100 can make received signal strength measurements 806 of the one or more wireless communication signals 804 from the second electronic device 303 to establish a pairing power signal strength threshold 807. At step 808, the one or more processors (201) of the electronic device 100 can place the wireless communication circuit (203) in a reduced power device discovery mode. At step 809, the one or more processors (201) can cause the wireless communication circuit (203) of the electronic device 100 to transmit a device discovery beacon 810 having a signal strength equal to or less than the pairing power signal strength threshold as previously described. In one or more embodiments, step 809 includes transmitting the device discovery beacon 810 periodically N times per second.

At step 811, the one or more processors (201) can optionally cause the wireless communication circuit (203) of the electronic device 100 to transmit another device discovery beacon 812 at a higher power than that established by the pairing power signals strength threshold. Illustrating by example, in one or more embodiments, the wireless communication circuit (203) has associated therewith a maximum signal strength threshold that defines a maximum signal strength at which the device discovery beacon 812 can be transmitted. Accordingly, in one or more embodiments the one or more processors (201) can cause the wireless communication circuit (203) of the electronic device 100 to transmit the device discovery beacon 812 at the maximum signal strength.

In one or more embodiments, step 811 occurs less frequently than does step 809. Illustrating by example, in one embodiment step 809 comprises transmitting the device discovery beacon 810 periodically N times per second as previously described. Accordingly, in one or more embodiments step 811 comprises transmitting the device discovery beacon 812 at the maximum signal strength periodically M times per second, where M is a number less than the number N.

At optional step 813, the method optionally includes, upon cessation of the peer-to-peer wireless communication link with the second electronic device 303, increasing 814, with the one or more processors (201) of the electronic device 100, the pairing power signal strength threshold by a predetermined signal strength adjustment threshold. As noted above, this predetermined signal strength adjustment threshold is, in one embodiment, less than a difference between the maximum signal strength threshold and the pairing power signal strength threshold. In one embodiment, step 813 comprises removing, with one or more processors (201) operable with the wireless communication circuit (203) of the electronic device 100, the wireless communication circuit (203) from the reduced power device discovery mode, and increasing 814, with the one or more processors (201), the pairing power signal strength threshold to the maximum signal strength threshold.

At step 815, the method detects 816, in one embodiment with the wireless communication circuit (203) during the transmitting the device discovery beacon 812 at the maximum signal strength, the third electronic device 402. Where this occurs, the electronic device can engage, with the wireless communication circuit (203), in another pairing procedure 817 to establish another peer-to-peer wireless communication link with the third electronic device 402. When this occurs, the wireless communication circuit (203) receives one or more other wireless communication signals 818 from the third electronic device 402 during the another pairing procedure and makes, at step 819 with the wireless communication circuit (203), additional received signal strength measurements 820 of the one or more other wireless communication signals 818 from the third electronic device 402 to establish another pairing power signal strength threshold 821. Where the other pairing power signal strength threshold 821 is greater than the pairing power signal strength threshold 807, the electronic device 100 can transmit 822, with the wireless communication circuit (203), another device discovery beacon having another signal strength equal to or less than the another pairing power signal strength threshold.

Figure 9:
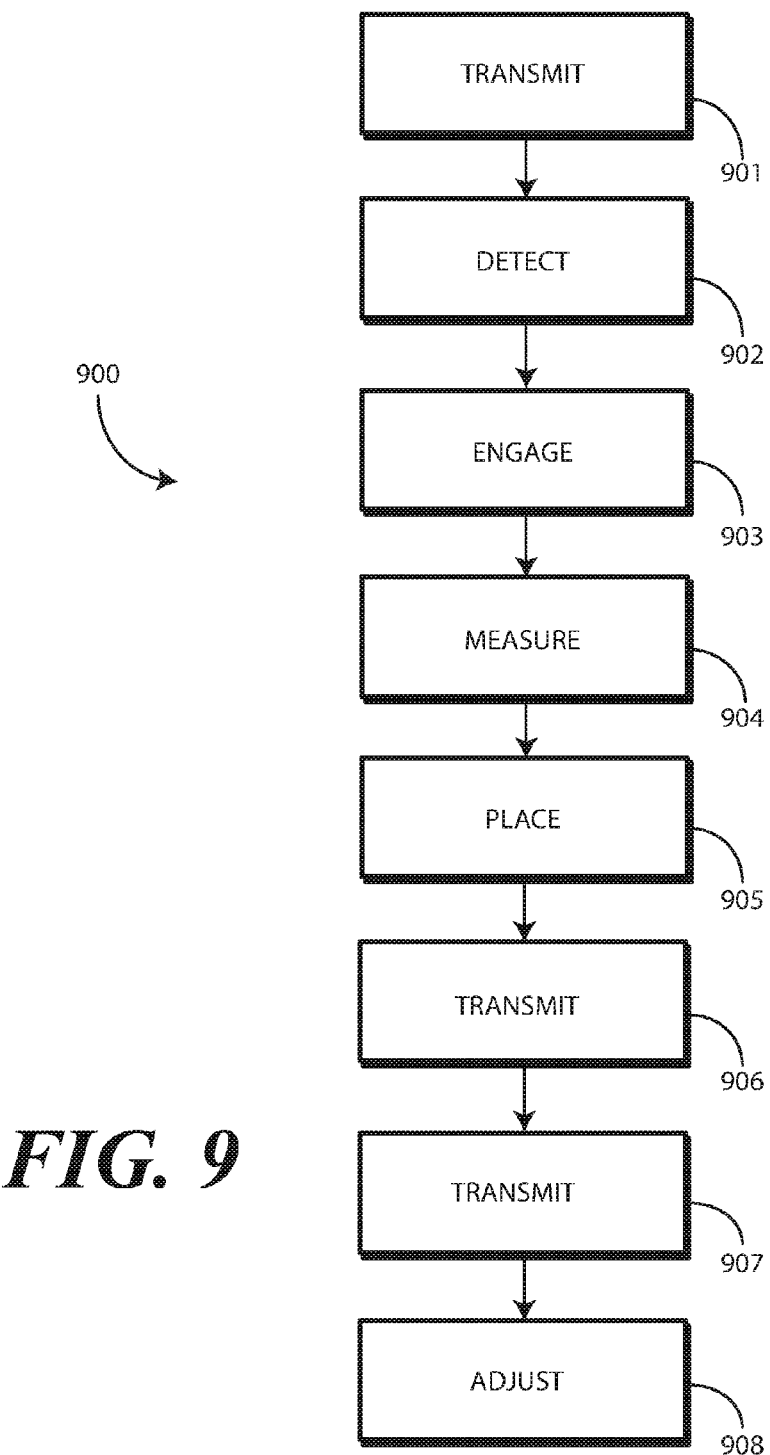
FIG. 9 illustrates one explanatory method in accordance with one or more embodiments of the disclosure.

Turning now to FIG. 9, illustrated therein is another method 900 for pairing electronic devices in accordance with one or more embodiments of the disclosure. At step 901, the method 900 includes transmitting, with a wireless communication circuit, a device discovery beacon at a maximum signal strength threshold. At step 902, the method 900 includes detecting, from received wireless communication signals, a second electronic device.

At step 903, the method 900 includes engaging, with the wireless communication circuit, in a pairing procedure to establish a peer-to-peer wireless communication link with the second electronic device. At step 904, the method includes making, with the wireless communication circuit, received signal strength measurements of the one or more wireless communication signals exchanged with the second electronic device to establish a pairing power signal strength threshold.

At step 905, the method 900 includes placing, with one or more processors operable with the wireless communication circuit, the wireless communication circuit in a reduced power device discovery mode. At step 906, the method 900 includes periodically transmitting, with the wireless communication circuit, a device discovery beacon having a signal strength equal to or less than the pairing power signal strength threshold.

At step 907, the method 900 optionally includes also periodically transmitting, with the wireless communication circuit, the device discovery beacon at the maximum signal strength threshold at a frequency less than transmissions of the device discovery beacon at the minimum signal strength threshold. At step 908, the method includes increasing the pairing power signal strength threshold upon detecting a third electronic device with a transmission of the device discovery beacon at the maximum signal strength threshold.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for pairing electronic devices, the method comprising:
   engaging, with a wireless communication circuit of an electronic device, in a pairing procedure to establish a peer-to-peer wireless communication link with a second electronic device;
   receiving, with the wireless communication circuit, one or more wireless communication signals from the second electronic device during the pairing procedure;
   making, with the wireless communication circuit, received signal strength measurements of the one or more wireless communication signals from the second electronic device to establish a pairing power signal strength threshold;
   placing, with one or more processors operable with the wireless communication circuit, the wireless communication circuit in a reduced power device discovery mode, wherein the wireless communication circuit also has a maximum signal strength threshold defining a maximum signal strength at which the device discovery beacon can be transmitted; and
   transmitting, with the wireless communication circuit, a device discovery beacon having a signal strength equal to or less than the pairing power signal strength threshold; and
   also transmitting the device discovery beacon at the maximum signal strength.

2. The method of claim 1, wherein the transmitting of the device discovery beacon occurs periodically N times per second.

3. The method of claim 2, wherein the transmitting the device discovery beacon at the maximum signal strength occurs periodically M times per second, where M is less than N.

4. The method of claim 3, further comprising, upon cessation of the peer-to-peer wireless communication link, increasing, with the one or more processors, the pairing power signal strength threshold by a predetermined signal strength adjustment threshold.

5. The method of claim 4, wherein the predetermined signal strength adjustment threshold less than a difference between the maximum signal strength threshold and the pairing power signal strength threshold.

6. The method of claim 3, further comprising, upon cessation of the peer-to-peer wireless communication link, removing, with one or more processors operable with the wireless communication circuit, the wireless communication circuit from the reduced power device discovery mode, and increasing, with the one or more processors, the pairing power signal strength threshold to the maximum signal strength threshold.

7. The method of claim 3, further comprising:
   detecting, with the wireless communication circuit during the transmitting the device discovery beacon at the maximum signal strength, a third electronic device;
   engaging, with the wireless communication circuit, in another pairing procedure to establish another peer-to-peer wireless communication link with the third electronic device;
   receiving, with the wireless communication circuit, one or more other wireless communication signals from the third electronic device during the another pairing procedure;
   making, with the wireless communication circuit, additional received signal strength measurements of the one or more other wireless communication signals from the third electronic device to establish another pairing power signal strength threshold; and where the another pairing power signal strength threshold is greater than the pairing power signal strength threshold, transmitting, with the wireless communication circuit, another device discovery beacon having another signal strength equal to or less than the another pairing power signal strength threshold.

8. The method of claim 3, further comprising:

communicating, with the wireless communication circuit, with the second electronic device on the peer-to-peer wireless communication link at the pairing power signal strength threshold;

performing, with the wireless communication circuit, a data exchange to determine a physical location of the second electronic device;

detecting, with a location detector operable with the one or more processors, movement of the electronic device, and one of:
  where the movement is toward the physical location, reducing the pairing power signal strength threshold; and
  where the movement is away from the physical location, increasing the pairing power signal strength threshold.

9. The method of claim 3, further comprising:

communicating, with the wireless communication circuit, with the second electronic device on the peer-to-peer wireless communication link at the pairing power signal strength threshold;

receiving, with the wireless communication circuit on the peer-to-peer wireless communication link, data indicating that a physical location of the second electronic device has changed, and one of:
  where the physical location is farther from the electronic device, increasing the pairing power signal strength threshold; and
  where the physical location is nearer to the electronic device, decreasing the pairing power signal strength threshold.

10. An electronic device, comprising:

one or more processors; and a wireless communication circuit operable with the one or more processors;

the one or more processors causing the wireless communication circuit to engage in a pairing procedure to:
  establish, during a pairing process, a peer-to-peer wireless communication link with a second electronic device;
  determine a minimum signal strength of wireless communication signals required to establish the peer-to-peer wireless communication link during the pairing process; and
  transmit a device discovery beacon having a signal strength equal to or less than the minimum signal strength;
  the one or more processors further to establish a reduced power discovery flag, the one or more processors causing the wireless communication circuit to transmit the device discovery beacon at the reduced signal strength only when the reduced power discovery flag is set.

11. The electronic device of claim 10, the one or more processors further causing the wireless communication circuit to periodically transmit the device discovery beacon at a maximum signal strength of the wireless communication circuit at a frequency less than that of transmissions of the device discovery beacon at the minimum signal strength.

12. The electronic device of claim 11, the one or more processors increasing the minimum signal strength by a predefined amount upon detecting, with a motion detector or from data exchange with the second electronic device, physical separation of the electronic device and the second electronic device.

13. The electronic device of claim 11, the one or more processors decreasing the minimum signal strength by a predefined amount upon detecting, with a motion detector or from data exchange with the second electronic device, motion of the electronic device toward the second electronic device.

14. The electronic device of claim 11, the one or more processors increasing the minimum signal strength upon failing to communicate with the second electronic device on the peer-to-peer wireless communication link.

15. The electronic device of claim 14, the one or more processors increasing the minimum signal strength to the maximum signal strength upon failing to communicate with the second electronic device on the peer-to-peer wireless communication link.

16. The electronic device of claim 11, the one or more processors detecting a third electronic device while transmitting the device discovery beacon at the maximum signal strength, and causing the wireless communication circuit to:
  establish another peer-to-peer wireless communication link with the third electronic device;
  determine whether another minimum signal strength required to establish the another peer-to-peer wireless communication link with the third electronic device is greater than the minimum signal strength required to establish the peer-to-peer communication link with the second electronic device; and
  where the another minimum signal strength required to establish the another peer-to-peer wireless communication link with the third electronic device is greater than the minimum signal strength required to establish the peer-to-peer communication link, transmit another device discovery beacon at the another minimum signal strength.

17. A method for pairing electronic devices, comprising:

transmitting, with a wireless communication circuit, a device discovery beacon at a maximum signal strength threshold;

detecting, from received wireless communication signals, a second electronic device;

engaging, with the wireless communication circuit, in a pairing procedure to establish a peer-to-peer wireless communication link with the second electronic device;

making, with the wireless communication circuit, received signal strength measurements of the one or more wireless communication signals exchanged with the second electronic device to establish a pairing power signal strength threshold;

placing, with one or more processors operable with the wireless communication circuit, the wireless communication circuit in a reduced power device discovery mode; and periodically transmitting, with the wireless communication circuit, a device discovery beacon having a signal strength equal to or less than the pairing power signal strength threshold; and also periodically transmitting, with the wireless communication circuit, the device discovery beacon at the maximum signal strength threshold.

18. The method of claim 17, the also periodically transmitting comprising transmitting the device discovery beacon at the maximum signal strength threshold at a frequency less than transmissions of the device discovery beacon at the minimum signal strength threshold.

19. The method of claim 18, further comprising increasing the pairing power signal strength threshold upon detecting a third electronic device with a transmission of the device discovery beacon at the maximum signal strength threshold.

\* \* \* \* \*